US012254732B2

(12) United States Patent
Prevost et al.

(10) Patent No.: US 12,254,732 B2
(45) Date of Patent: Mar. 18, 2025

(54) PHYSICAL ACCESS CONTROL SYSTEMS AND METHODS

(71) Applicant: HID Global Corp., Austin, TX (US)

(72) Inventors: Sylvain Jacques Prevost, Austin, TX (US); Kapil Sachdeva, Round Rock, TX (US); Stephen Carney, Foxboro, MA (US); Wayne Pak, Seoul-Si (KR); Jianbo Chen, Cedar Park, TX (US)

(73) Assignee: HID Global Corp., Austin, TX (US)

( * ) Notice: Subject to any disclaimer, the term of this patent is extended or adjusted under 35 U.S.C. 154(b) by 0 days.

(21) Appl. No.: 17/595,579

(22) PCT Filed: May 20, 2020

(86) PCT No.: PCT/US2020/033768
§ 371 (c)(1),
(2) Date: Nov. 19, 2021

(87) PCT Pub. No.: WO2020/236912
PCT Pub. Date: Nov. 26, 2020

(65) Prior Publication Data
US 2022/0230498 A1    Jul. 21, 2022

Related U.S. Application Data

(60) Provisional application No. 62/850,802, filed on May 21, 2019.

(51) Int. Cl.
*G07C 9/27* (2020.01)
*G06V 40/16* (2022.01)
(Continued)

(52) U.S. Cl.
CPC ............. *G07C 9/27* (2020.01); *G06V 40/172* (2022.01); *G07C 9/00309* (2013.01);
(Continued)

(58) Field of Classification Search
CPC ...... G07C 9/27; G07C 9/00309; G07C 9/257; G07C 2009/00412; G07C 2009/00769
See application file for complete search history.

(56) References Cited

U.S. PATENT DOCUMENTS 9,312,922 B2      4/2016   Gimeno et al.
9,794,753 B1 *   10/2017   Stitt ..................... G06F 21/31
(Continued)

FOREIGN PATENT DOCUMENTS

AU     2020280017       9/2023
CN     106131015       11/2016
(Continued)

OTHER PUBLICATIONS

"European Application Serial No. 20731715.7, Response Filed May 4, 2022 to Communication Pursuant to Rules 161 (1) and 162 EPC filed Jan. 5, 2022", 12 pgs.
(Continued)

*Primary Examiner* — Nabil H Syed
(74) *Attorney, Agent, or Firm* — Schwegman Lundberg & Woessner, P.A.

(57) ABSTRACT

A physical access control (PAC) system comprises an authentication device that includes physical layer circuitry and processing circuitry. The physical layer circuitry transmits and receives radio frequency electrical signals over a radio access network. The processing circuitry is operatively coupled to the physical layer circuitry and includes an authentication engine. The authentication engine is configured to receive access credential information via the radio access network using a cloud-based messaging service; authenticate the access credential information using the authentication device; and initiate access to a physical access portal according to the access credential information.

17 Claims, 8 Drawing Sheets

(51) Int. Cl.
　　　*G07C 9/00*　　　(2020.01)
　　　*G07C 9/25*　　　(2020.01)
　　　*H04W 4/80*　　　(2018.01)
　　　*H04W 12/06*　　(2021.01)
　　　*H04W 12/08*　　(2021.01)

(52) U.S. Cl.
　　　CPC .............. *G07C 9/257* (2020.01); *H04W 4/80* (2018.02); *H04W 12/06* (2013.01); *H04W 12/08* (2013.01); *G07C 2009/00412* (2013.01); *G07C 2009/00769* (2013.01)

(56) References Cited

U.S. PATENT DOCUMENTS

| | | | |
|---|---|---|---|
| 10,032,171 | B2 | 7/2018 | Yeager |
| 10,185,921 | B1 | 1/2019 | Heller et al. |
| 2010/0201536 | A1* | 8/2010 | Robertson .......... G07C 9/00904 340/5.61 |
| 2014/0282929 | A1 | 9/2014 | Tse |
| 2015/0028996 | A1 | 1/2015 | Agrafioti et al. |
| 2017/0134122 | A1 | 5/2017 | Noda |
| 2018/0061155 | A1* | 3/2018 | Ghorpade .......... G07C 9/00571 |
| 2018/0089916 | A1 | 3/2018 | Drako et al. |
| 2019/0340858 | A1 | 11/2019 | Ouellet |
| 2021/0201609 | A1* | 7/2021 | Amuduri ................ G07C 9/253 |
| 2022/0392283 | A1* | 12/2022 | Charling .................. G07C 9/23 |
| 2023/0252837 | A1 | 8/2023 | Prevost et al. |
| 2024/0015149 | A1 | 1/2024 | Sachdeva et al. |
| 2024/0022389 | A1 | 1/2024 | Sachdeva et al. |

FOREIGN PATENT DOCUMENTS

| | | |
|---|---|---|
| CN | 109064599 | 12/2018 |
| CN | 109559407 | 4/2019 |
| CN | 116458123 | 7/2023 |
| CN | 114679916 | 8/2024 |
| EP | 2053774 | 4/2009 |
| EP | 2437193 | 4/2012 |
| IN | 202117053266 | 4/2022 |
| IN | 202317039312 | 7/2024 |
| JP | 2005202935 | 7/2005 |
| JP | 2008099087 | 4/2008 |
| JP | 2009177718 | 8/2009 |
| JP | 2011501592 | 1/2011 |
| JP | 2017010380 | 1/2017 |
| JP | 2017522664 | 8/2017 |
| JP | 2017538346 | 12/2017 |
| JP | 6305559 | 3/2018 |
| JP | 2019061672 | 4/2019 |
| JP | 2019145854 | 8/2019 |
| JP | 2022532932 | 7/2022 |
| JP | 7274613 B2 | 5/2023 |
| JP | 2023062169 A | 5/2023 |
| JP | 2023549817 | 11/2023 |
| JP | 2023180257 | 12/2023 |
| JP | 7544885 | 8/2024 |
| KR | 20180025903 | 3/2018 |
| KR | 102680676 | 6/2024 |
| WO | 2007010333 | 1/2007 |
| WO | 2016157689 | 10/2016 |
| WO | WO-2017031504 A1 | 2/2017 |
| WO | WO-2020236912 A1 | 11/2020 |
| WO | 2022101405 | 5/2022 |

OTHER PUBLICATIONS

"Indian Application Serial No. 202117053266, First Examination Report mailed May 12, 2022", w English Translation, 6 pgs.
"Australian Application Serial No. 2020280017, First Examination Report mailed Sep. 2, 2022", 3 pgs.
"Japanese Application Serial No. 2021-569453, Notification of Reasons for Refusal mailed Nov. 29, 2022", w/ English translation, 10 pgs.
"Indian Application Serial No. 202117053266, Response Filed Nov. 11, 2022 to First Examination Report mailed May 12, 2022", w/ English Claims, 23 pgs.
"Korean Application Serial No. 10-2021-7037875, Notice of Preliminary Rejection mailed Nov. 29, 2022", W English Translation, 20 pgs.
"Australian Application Serial No. 2020280017, Response Filed Dec. 16, 2022 to First Examination Report mailed Sep. 2, 2022", 14 pgs.
"Canadian Application Serial No. 3,138,776, Examiners Rule 86(2) Requisition mailed Jan. 31, 2023", 5 pgs.
"Australian Application Serial No. 2020280017, Subsequent Examiners Report mailed Jan. 16, 2023", 3 pgs.
"Korean Application Serial No. 10-2021-7037875, Response Filed Jan. 26, 2023 to Notice of Preliminary Rejection mailed Nov. 29, 2022", W English Claims, 30 pgs.
"Japanese Application Serial No. 2021-569453, Response Filed Feb. 22, 2023 to Notification of Reasons for Refusal mailed Nov. 29, 2022", w English Claims, 10 pgs.
"Firebase Cloud Messaging", Google Firebase Documentation, [Online] Retrieved from the Internet: <URL: https://web.archive.org/web/20190415002940/https://firebase.google.com/docs/cloud-messaging/>, (Mar. 29, 2019), 6 pgs.
"International Application Serial No. PCT/US2020/033768, International Search Report mailed Sep. 10, 2020", 6 pgs.
"International Application Serial No. PCT/US2020/033768, Written Opinion mailed Sep. 10, 2020", 7 pgs.
"European Application Serial No. 20731715.7, Communication Pursuant to Article 94(3) EPC mailed Aug. 31, 2023", 8 pages.
"Canadian Application Serial No. 3,138,776, Examiners Rule 86(2) Report mailed Oct. 30, 2023", 5 pages.
"Korean Application Serial No. 10-2021-7037875, Response filed Nov. 15, 2023 to Notice of Preliminary Rejection mailed May 15, 2023", with English claims, 29 pages.
"Chinese Application Serial No. 202080038055.5, Office Action mailed Oct. 28, 2023", with English translation, 18 pages.
Genetec, "Synergis Cloud Link CSPN Security Target Version 1.1", with machine English translation, (Aug. 16, 2018), 99 pages.
Gunnebo, "CSPN Security Target for Gunnebo Product SMI—CSPN Version 01-02 SMI Solution Identification Authentication for Physical Access Control", with machine English translation, (Jun. 2017), 71 pages.
NEDAP, "CSPN Security Target—Physical Access Management—Transparent Drive", with machine English translation, (Feb. 26, 2013), 79 pages.
U.S. Appl. No. 18/301,427, filed Apr. 17, 2023, Physical Access Control Systems and Methods.
"U.S. Appl. No. 18/301,427, Preliminary Amendment filed Apr. 17, 2023", 6 pgs.
"Australian Application Serial No. 2020280017, Response Filed Apr. 18, 2023 Subsequent Examiners Report mailed Jan. 16, 2023", 15 pgs.
"Canadian Application Serial No. 3,138,776, Response Filed May 30, 2023 to Examiners Rule 86(2) Requisition mailed Jan. 31, 2023", 11 pgs.
"Korean Application Serial No. 10-2021-7037875, Notice of Preliminary Rejection mailed May 15, 2023", with English translation, 15 pages.
"Synergis Cloud Link Datasheet", Genetec Inc., (2019), 2 pgs.
"International Application Serial No. PCT EP2021 081512, Invitation to Pay Additional Fees mailed Mar. 10, 2022", 11 pgs.
"International Application Serial No. PCT EP2021 081512, International Search Report mailed Jun. 14, 2022", 7 pgs.
"International Application Serial No. PCT EP2021 081512, Written Opinion mailed Jun. 14, 2022", 11 pgs.
"Application Serial No. 18 250,033, Preliminary Amendment Filed Apr. 21, 2023", 6 pgs.
"Application Serial No. 18 250,023, Preliminary Amendment Filed Apr. 21, 2023", 8 pgs.
"International Application Serial No. PCT EP2021 081512, International Preliminary Report on Patentability mailed May 25, 2023", 13 pgs.

(56) References Cited

OTHER PUBLICATIONS

"Canadian Application Serial No. 3198185, Voluntary Amendment Filed Jun. 20, 2023", 9 pgs.
"Australian Application Serial No. 2021380017, Voluntary Amendment Filed Jun. 22, 2023", 16 pgs.
"Japanese Application Serial No. 2023-528465, Voluntary Amendment Filed Jun. 26, 2023", with English translation, 12 pages.
"Japanese Application Serial No. 2023-104960, Voluntary Amendment Filed Jun. 29, 2023", with English translation, 61 pages.
"Indian Application Serial No. 202317039312, Voluntary Amendment Filed Jul. 7, 2023", with English claims, 17 pages.
"Application Serial No. 18 355,858, Preliminary Amendment Filed Jul. 20, 2023", 6 pgs.
"European Application Serial No. 23195891.9, Extended European Search Report mailed Dec. 13, 2023", 9 pgs.
"European Application Serial No. 20731715.7, Response Filed Dec. 21, 2023 to Communication Pursuant to Article 94(3) EPC mailed Aug. 31, 2023", 9 pgs.
"European Application Serial No. 21814727.0, Response Filed Dec. 19, 2023 to Communication pursuant to Rules 161 and 162 mailed Jun. 21, 2023", 14 pgs.
"European Application Serial No. 23195891.9, Response filed Jul. 8, 2024 to Extended European Search Report mailed Dec. 13, 2023", 40 pgs.
"European Application Serial No. 20731715.7, Response filed Jul. 8, 2024 to Communication Pursuant to Article 94(3) EPC mailed Mar. 7, 2024", 26 pgs.
"Japanese Application Serial No. 2023-026227, Response Filed Jul. 1, 2024 to Notification of Reasons for Refusal mailed Apr. 2, 2024", with English claims, 6 pages.
"Mexican Application Serial No. MX a 2021-014188, Voluntary Amendment filed Apr. 16, 2024", with English claims, 17 pages.
"Japanese Application Serial No. 2023-104960, Response Filed Sep. 11, 2024 to Notification of Reasons for Refusal mailed Jun. 18, 2024", with English claims, 11 pages.
"Australian Application Serial No. 2021380017, Response Filed Sep. 19, 2024 to First Examination Report mailed Mar. 5, 2024", 55 pgs.
"Japanese Application Serial No. 2023-528465, Response Filed Sep. 13, 2024 to Notification of Reasons for Refusal mailed Jun. 25, 2024", with English claims, 12 pages.
"European Application Serial No. 20731715.7, Communication Pursuant to Article 94(3) EPC mailed Mar. 7, 2024", 9 pgs.
"Chinese Application Serial No. 202080038055.5, Response filed Mar. 12, 2024 to Office Action mailed Oct. 28, 2023", with English claims, 16 pages.
"Australian Application Serial No. 2021380017, First Examination Report mailed Mar. 5, 2024", 3 pgs.
"Japanese Application Serial No. 2023-026227, Notification of Reasons for Refusal mailed Apr. 2, 2024", with English translation, 10 pages.
"Canadian Application Serial No. 3, 138,776, Response Filed Feb. 29, 2024 to Examiners Rule 86(2) Report mailed Oct. 30, 2023", 15 pgs.
"Japanese Application Serial No. 2023-104960, Notification of Reasons for Refusal mailed Jun. 18, 2024", with English translation, 16 pages.
"Australian Application Serial No. 2023219930, First Examination Report mailed Jun. 18, 2024", 2 pgs.
"Japanese Application Serial No. 2023-528465, Notification of Reasons for Refusal mailed Jun. 25, 2024", with machine English translation, 8 pages.
"Canadian Application Serial No. 3, 198, 185, Examiners Rule 86(2) Report mailed Nov. 1, 2024", 3 pages.
"European Application Serial No. 21814727.0, Communication Pursuant to Article 94(3) EPC mailed Oct. 8, 2024", 5 pages.

* cited by examiner

PHYSICAL ACCESS CONTROL SYSTEMS AND METHODS

CLAIM OF PRIORITY

This application is a U.S. National Stage filing under 35 U.S.C. of PCT Patent Application Serial No. PCT/US2020/033768, filed on May 20, 2020, which claims priority to U.S. Provisional Patent Application Ser. No. 62/850,802, filed May 21, 2019, which are incorporated herein by reference in their entirety.

TECHNICAL FIELD

Embodiments illustrated and described herein generally relate to system architectures for physical access control systems.

BACKGROUND

Seamless access control refers to when physical access is granted to an authorized user through a controlled portal without requiring intrusive actions of the user such as entering or swiping an access card at a card reader or entering a personal identification number (PIN) or password. A Physical Access Control (PAC) system is a type of system that can provide seamless access. A PAC system authenticates and authorizes a person to pass through a physical access point such as a secured door. Improvements to PAC systems are described herein having innovative interplay between wireless technologies, smart phones, secure gateways and cloud infrastructure. These improvements not only enhance the security of the overall system, they also lead to a better user experience.

DETAILED DESCRIPTION

Figure 1:
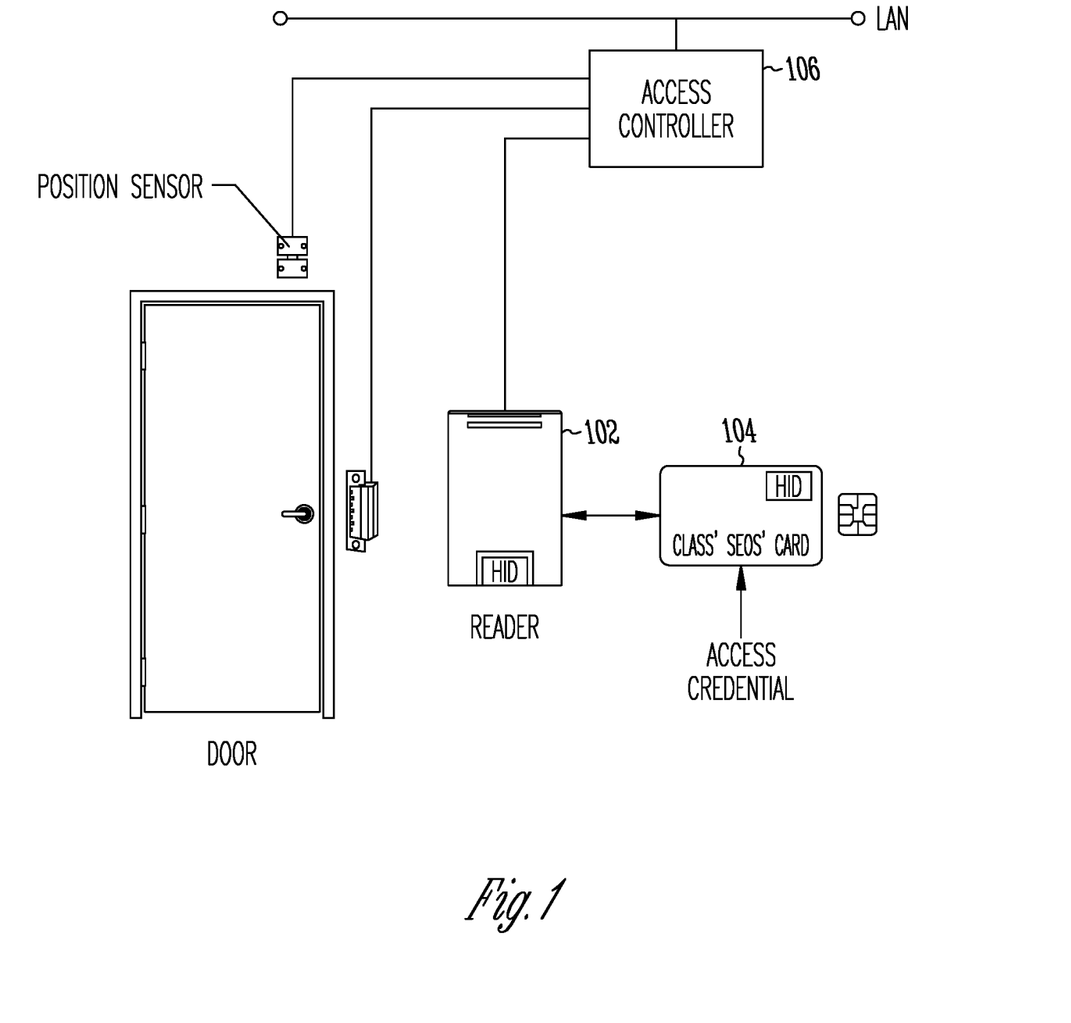
FIG. 1 is an illustration of a basic Physical Access Control (PAC) System structure.

FIG. 1 is an illustration of a basic PACS structure useful for an office application. The Access Credential is a data object, a piece of knowledge (e.g., PIN, password, etc.), or a facet of the person's physical being (e.g., face, fingerprint, etc.) that provides proof of the person's identity. The Credential Device 104 stores the Access Credential when the Access Credential is a data object. The Credential Device 104 may be a smartcard or smartphone. Other examples of Credential Devices include, but are not limited to, proximity radio frequency identifier (RFID) based cards, access control cards, credit cards, debit cards, passports, identification cards, key fobs, near field communication (NFC) enabled devices, mobile phones, personal digital assistants (PDAs), tags, or any other device configurable to emulate a virtual credential.

The Credential Device 104 can be referred to as the Access Credential. The Reader device 102 retrieves and authenticates the Access Credential when using a Credential Device and sends the Access Credential to the Access Controller 106. The Access Controller 106 compares the Access Credential to an Access Control list and grants or denies access based on the comparison, such as by controlling an automatic lock on a door for example.

The functionality of an Access Controller 106 may be included in the Reader device 102. These Reader devices can be referred to as offline readers or standalone readers. If the unlocking mechanism is included as well, a device is referred to as smart door lock which is more typically used in residential applications. Devices such as smart door locks are often battery powered, and power consumption and battery lifetime can be key parameters for the devices.

Figure 2:
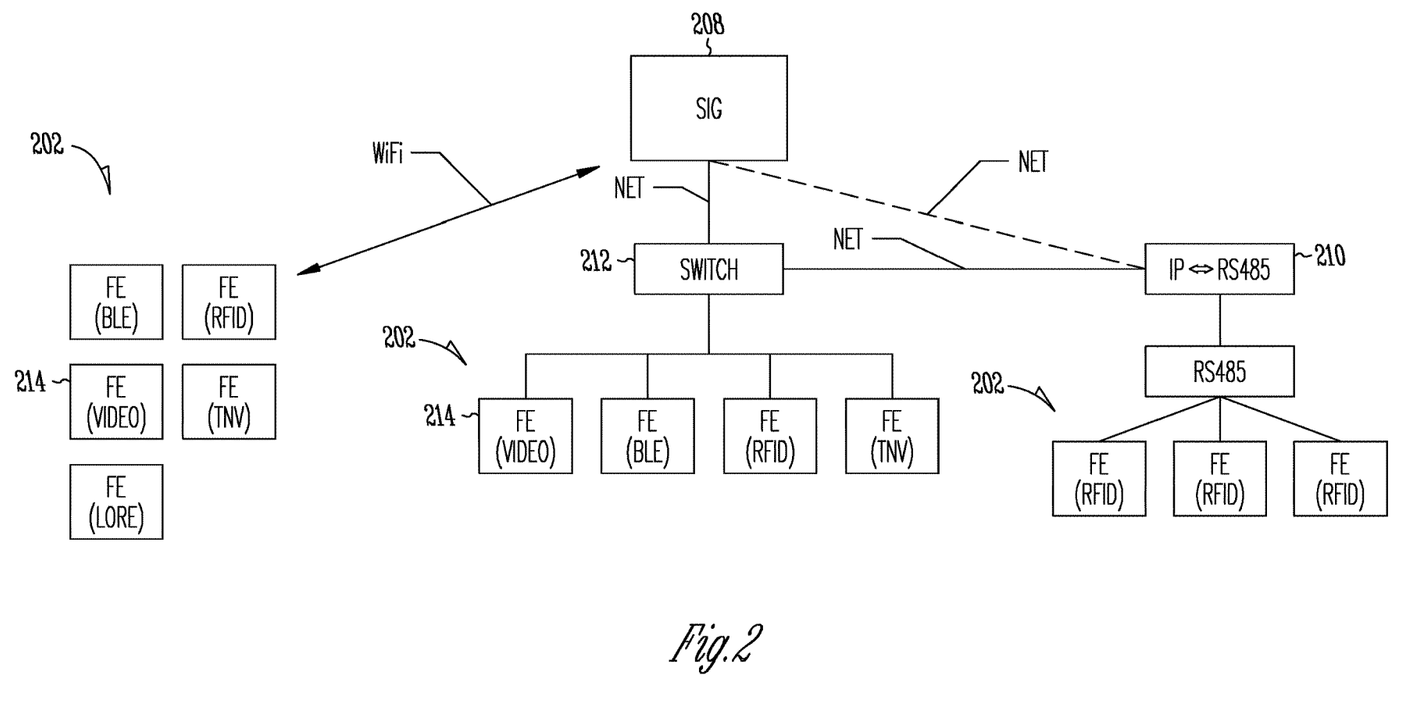
FIG. 2 is a block diagram of an example of PAC system backend architecture.

FIG. 2 is a block diagram of an example of a PAC system backend architecture. The physical access control authorization logic is moved from a Reader device or an Access Controller local to the physical access portal to a Secure Internet of Things (IoT) Gateway (SIG) that can be remote from the physical access portal. Because the policy can be controlled centrally with this architecture, this can provide advantages in changing access policy and in reducing the complexity and cost of remote Reader devices. The Reader devices, or Front End (FE) devices, at or near the portal location are still present, but can be simplified to basically include an antenna and a modulator/demodulator to exchange signals with Credential Devices. The signals are transferred to the SIG 208 for analysis related to access control using the physical access control authorization logic. The authorization logic of the SIG 208 may include an authorization engine to make the authentication decisions at a central location for access control at many remote locations. The authorization engine of the SIG 208 may also manage sensor-driven identification at the remote locations.

The example in FIG. 2 shows FE devices 202 connected using a wired interface to an Ethernet network (or other Local Area Network, or LAN) that connects to the SIG 208. The LAN may be a transmission control protocol Internet protocol TCP/IP) based network or may be an IoT mesh network. The wired interface may include an RS485 to Internet Protocol (IP) translation 210. The Ethernet network may include an Ethernet switch 212 for connection to the SIG 208. The SIG 208 can include a WiFi physical layer for connection to a WiFi network for communication with the FE devices 202.

The FE devices 202 may relay credential information (e.g., PAC Reader devices) from Credential devices (e.g., RFID devices) to the SIG 208. The FE devices 202 may be connected to one or more sensor devices 214 (e.g., cameras) for sensor-driven authentication. The FE devices 202 may communicate with other downstream devices using Bluetooth™ Low Energy (BLE) signaling to provide additional wireless capability. In other examples, the FE devices 202 may provide wireless capability using Long Range (LoRa) low energy network communications, Zigbee network communications, or Long Term Evolution (LTE) network communications, Ultra-Wide Band communications, Sigfox communications, etc.

In some examples, the FE devices 202 provide additional computing capabilities for the PAC system (e.g., an FE device may include or communicate with a graphics processing unit or GPU). The FE devices 202 may include artificial intelligence (AI) (e.g., neural networks) or communicate with AI devices to provide facial recognition capability, anomaly analysis, etc. The FE modules may extend storage capabilities of the SIG 208 (e.g., by storing access logs or other access data).

Figure 3:
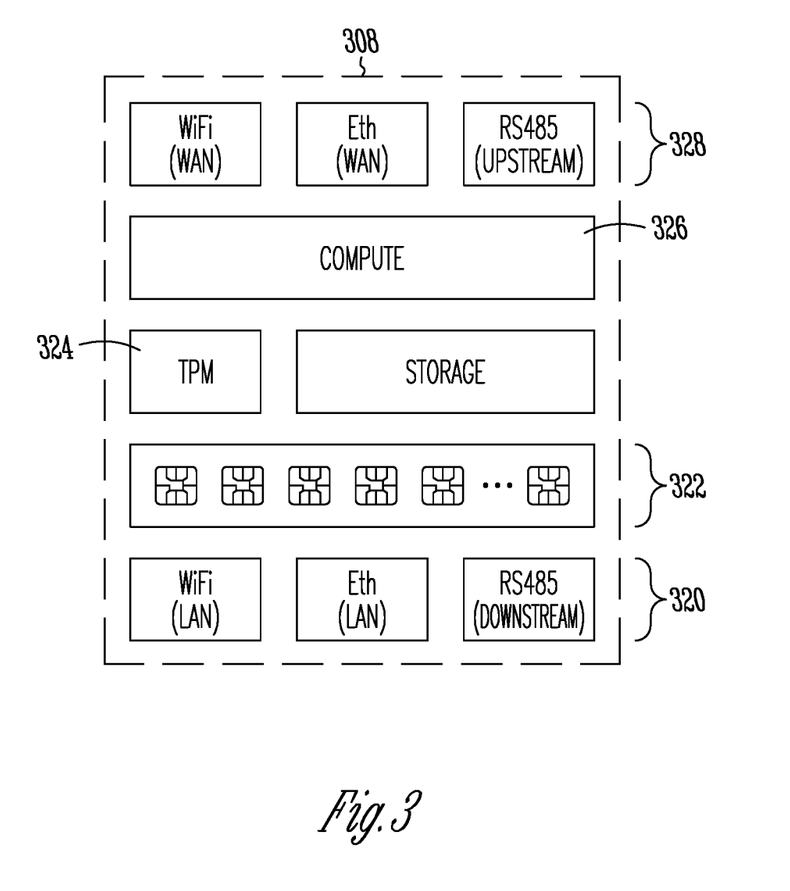
FIG. 3 is a block diagram of a layer model for a Secure Internet of things Gateway (SIG) device.

FIG. 3 is an example of a layer model of a SIG 308. The SIG 308 includes physical layer circuitry 320 for accessing WiFi, Ethernet, or RS485 interfaces to communicate with downstream FE devices. The SIG 308 includes an array of secure elements 322. The number of secure elements 322 in the array depends on the load balancing requirements of remote FE devices (e.g., Reader devices). The secure elements 322 are used to exchange credential information with Credential devices and can enhance security to the transfer of communication for the physical access. The secure elements 322 may store cryptographic keys for secure transmission and reception of sensitive data and may perform authentication of Credential devices and users of the devices. In certain examples, the secure elements 322 are Hardware Security Modules (HSMs). Because the secure elements 322 of the SIG 308 exchange credential information with the Credential devices, the Reader devices may be used in a transparent mode in which they wirelessly relay information between the Credential devices and the secure elements 322 of the SIG 308. The Reader devices may not provide any analysis of the information being relayed and would not be aware of any logical need for communication between the SIG 308 and the Credential devices. One of the secure elements 322 may be allocated for each authentication session. The connectivity between the Reader device and a SIG backend can be either direct (e.g., LAN) or indirect (e.g., via a gateway/controller).

The SIG 308 also includes a Trusted Platform Module (TPM) 324. The TPM 324 is a type of secure hardware element sometimes used in system on chip (SoC) devices. Including the TPM in the SIG 308 complements the secure elements 322 by enabling the secure bootstrap of the SIG 308 and providing secure primitives to the applications running on the SIG 308. The SIG 308 also includes processing circuitry 326 and memory storage. The SIG 308 may include a server remote from the access portals it controls. The SIG 308 may include additional physical layers 328 for communicating upstream to devices in the system backend.

Figure 4:
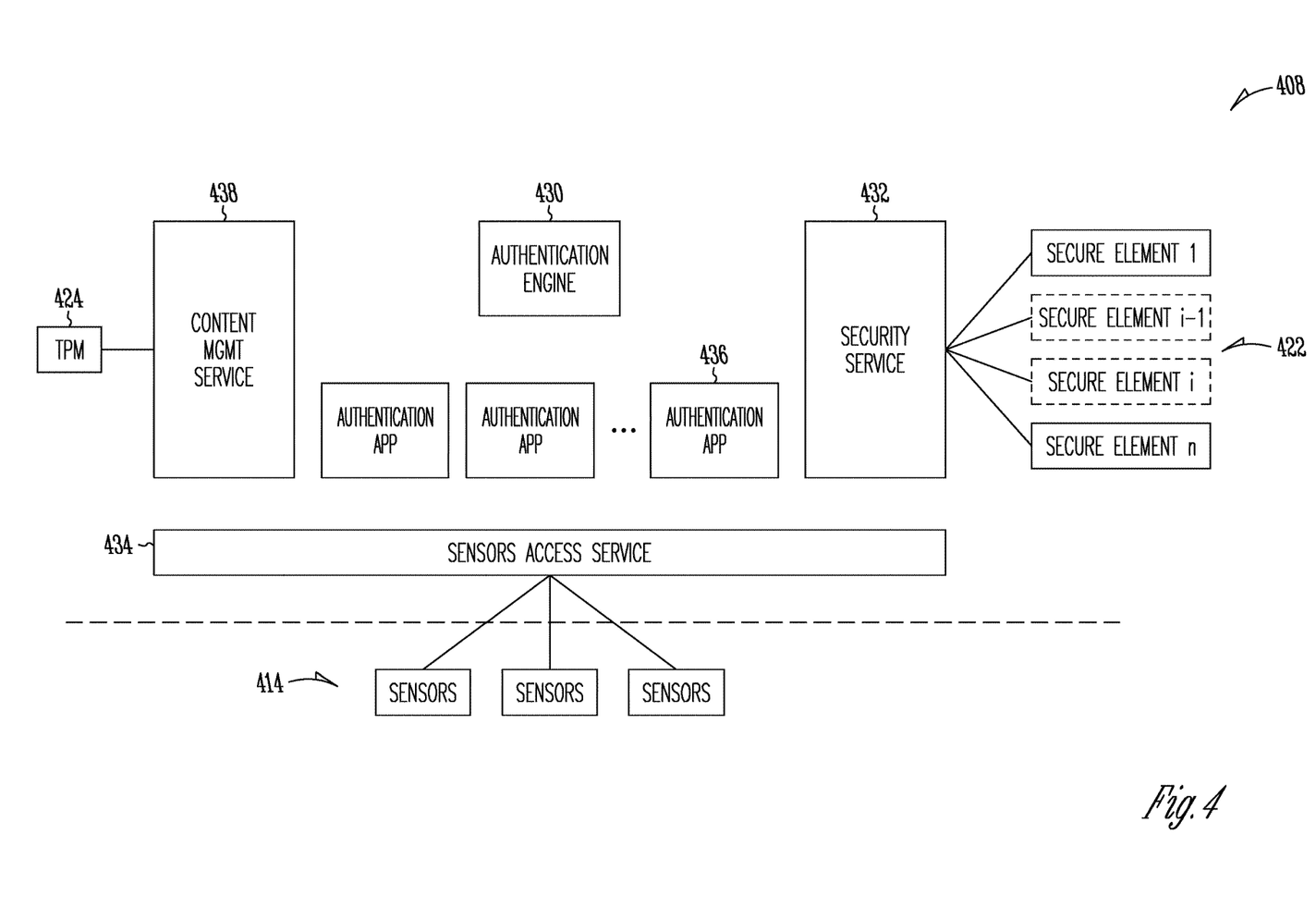
FIG. 4 is a block diagram of an example of a software architecture of a SIG device.

FIG. 4 is a block diagram of an example of a software architecture of a SIG 408. The SIG 408 includes processing circuitry (e.g., one or more processors) executing instructions included in the software to perform the functions described. The processing circuitry and software of the SIG 408 implement an Authentication Engine 430 as a central source to make the authentication decisions. Changing the authentication logic of the Authentication Engine 430 changes the access policy for all of the physical access portals. A Security Service 432 provides load balancing of the authentication sessions being performed by the secure elements 422. The Security Service 432 may cause the secure element to open and manage a secure channel with an access credential device. The SIG 408 includes a Sensors Access Service 434 to process the information (e.g., sensor data) coming from authentication sensors 414. For example, the authentication sensors 414 may include cameras that provide video streams for authentication (e.g., by facial recognition). The Sensors Access Service 434 processes the sensor information and the SIG 408 may include authentication applications 436 or "Apps" to perform authentication using the information provided by the sensors.

For physical access applications, the Authentication Engine 430 needs to authenticate a person. This can require different methodologies than those used by electronic devices to authenticate another electronic device. Authentication methods for persons can be split into four broad categories: authentication by "Who you are" which can be determined by face, fingerprint, or other biometric, "What do you have" which can be determined by a credential device, "What do you know" which can be determined by a password or PIN, and "Where you are" which can be determined by proof of presence and proof of intent to access.

As explained previously herein, for seamless PAC it is desired for the authentication to not require intrusive action by the user. Sensors and credential devices can be used to seamlessly authenticate a person for access. Sensors can be used for close range detection and authentication (e.g., 3 meters or less) using biometrics such as facial recognition, gait analysis, etc. Credential devices such as smartphones or smartcards can be used for longer range (e.g., up to around 15 meters) detection and authentication.

For longer range authentication using a smartphone as a credential device, it is not desirable for the smartphone to always be actively looking for an authentication session. This can result in unwanted draining of the battery of the smartphone. The draining of the battery may lead to the smartphone not being able to provide seamless access due to low battery, or the user turning the smartphone off or otherwise disabling the seamless access. A better approach is to have the authentication triggered when the smartphone (and the person) are in the vicinity of the controlled access. Different approaches can be used to trigger the authentication.

Figure 5:
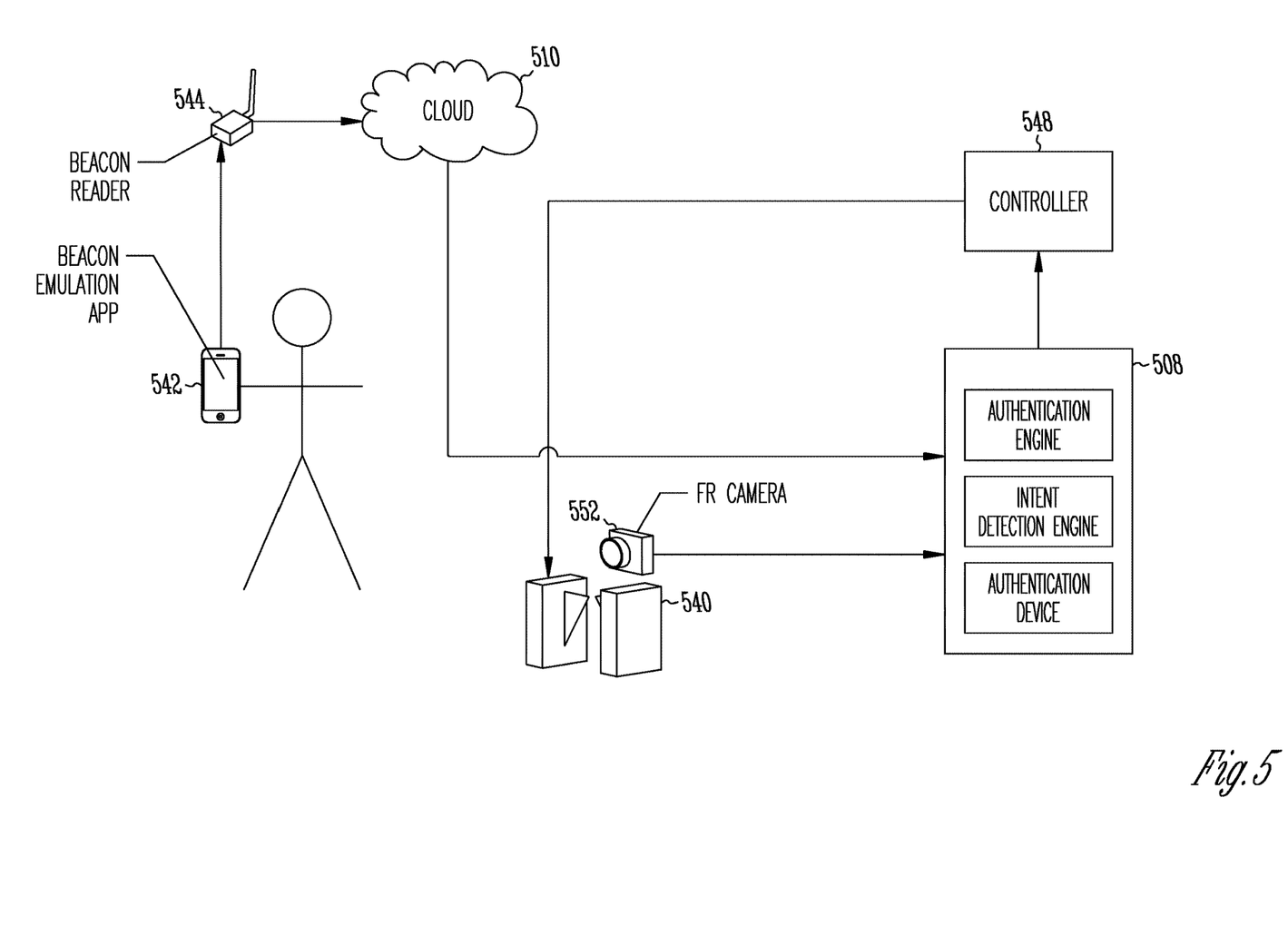
FIG. 5 is a diagram of an example of a PAC system that authenticates access by a user of a smartphone.

FIG. 5 is a diagram of an example of a PAC system that authenticates access using a smartphone. In this example, the access control portal is a turnstile 540. The smartphone 542 emits a low energy level beacon signal in a low energy broadcast mode. For example, the smartphone 542 may support background Bluetooth™ Low Energy (BLE) advertising when the smartphone is configured as a Bluetooth™ peripheral device. BLE is only an example and other wireless protocols either long range or short range can be used. The term beacon is intended to include all wireless signals that can potentially serve the functions of the beacon described herein.

The beacon signal is detected using a beacon reader device 544 or beacon detector of the PAC system. The beacon reader device 544 sends notice of the beacon detection to a seamless access authentication device 508 (e.g., a SIG device, or a backend server). The beacon reader device 544 may send a message indicating beacon detection via the cloud 510 (e.g., using a cloud-based messaging service). The term "cloud" is used herein to refer to a hardware abstraction. Instead of one dedicated server processing messages or routing messages, the messages can be sent to a file data center or processing center. The actual server used for the processing and routing may be interchangeable at the data center or processing center. In other examples, the notice of the detected beacon signal can be sent to the authentication device 508 using a WiFi network of the PAC system instead of the cloud. In variations, the notice of the detected beacon signal can be sent to the authentication device 508 using other networking systems (e.g., IoT mesh networks) if for example the WiFi network and cloud are unavailable.

In response to the notice of the beacon, the authentication device 508 triggers the sending of a cloud-based message to the smartphone 542. The cloud-based message is received by the smartphone and an App of the smartphone 542 can be activated. The cloud-based messaging should reliably waken or enable the smartphone 542 from a low power mode (e.g., a sleep mode) to an active mode. "Reliably" means that an exchange or transfer of information is performed regardless of the state of the applications in the smartphone (e.g., sleep mode, deep-sleep mode, background or foreground applications).

When one or more Apps of the smartphone are wakened or enabled, information related to authentication may then be exchanged with the authentication device 508. The authentication device 508 may initiate a secure session with the smartphone for transfer of authentication information with the smartphone 542. Secure communications may be established between the smartphone 542 and a secure element of the authentication device 508. The secure communications may be via the cloud 510. The secure element may share a temporary session key (e.g., using a security token service or STS seed) with the smartphone 542. The secure communications retrieve the access credential information from the smartphone 542. After successful authentication of the access credential information, the authentication device 508 may transmit information (e.g., via Ethernet or other LAN) to an access controller 548 to allow access or the authentication device 508 may deny access.

In some examples, the authentication device 508 is a Reader device that includes authentication capability. The secure communication channel may be a BLE communication channel, WiFi channel, or other radio frequency (RF) communication channel established between the Reader device and the smartphone 542, and the Reader device includes the authentication logic to authenticate the access credential. The Reader device communicates with the access controller 548 to allow access or deny access. In variations the Reader device is a Reader/Control device and no communication needs to be sent to grant or deny access. Instead, the Reader/Control device itself directly grants or denies access according to the authentication operation.

Figure 6:
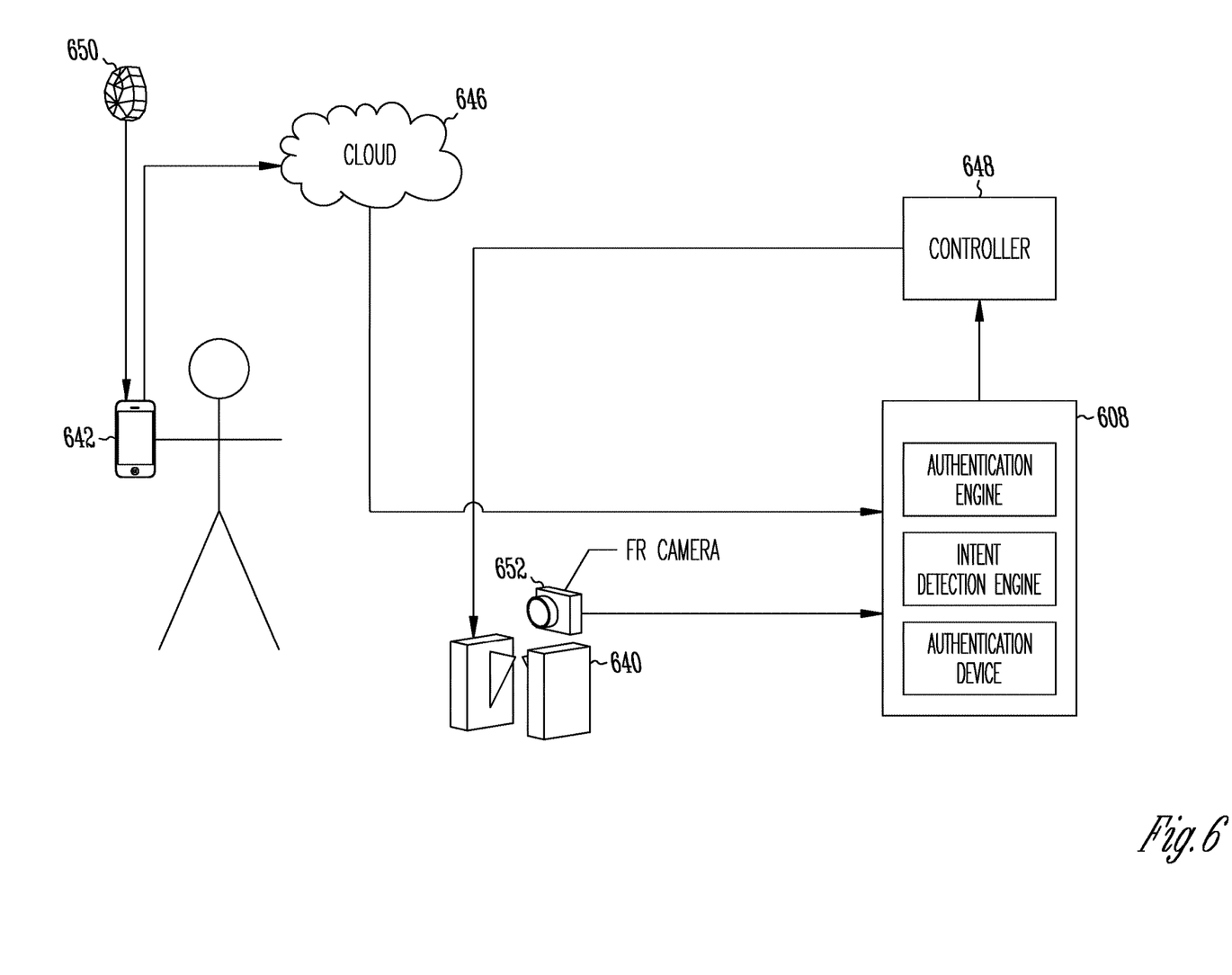
FIG. 6 is a diagram of another example of a PAC system that authenticates access of a user of a smartphone.

FIG. 6 is a diagram of another example of a PAC system that authenticates access using a smartphone 642. In this example, the access control portal is again a turnstile 640. However, the smartphone 642 does not broadcast a beacon for detection by a beacon reader. Instead, the smartphone 642 is enabled in a read mode or scan mode to look for a beacon signal from a beacon transmitting device 650 positioned in the vicinity of the controlled access portal. For example, the smartphone 642 may support background BLE scanning when the smartphone is configured as a Bluetooth™ central device. Applications of the smartphone 642 may be activated or wakened when a specific data pattern is detected within a specific timing window.

When a beacon from the beacon transmitting device 650 is detected by the smartphone 642, the smartphone 642 sends a communication to the authentication device 608 to begin an authentication session. The communication may be sent to the authentication device 608 via the cloud 646. When the communication from the smartphone 642 is received, the authentication device 608 may then initiate a secure session with the smartphone 642 to exchange authentication information with the smartphone 642. Secure communications may be established between the smartphone 642 and a secure element of the authentication device 608 via the cloud 646 to retrieve the access credential. After successful authentication of the access credential, the authentication device 608 may transmit information to the access controller 648 to allow access or the authentication device 608 may deny access. The authentication device 608 may be configured to communicate with either read mode smartphones or broadcast mode smartphones, so that one authentication device 608 may service multiple controlled access portals that may use either type of communication technique.

The authentication device 608 may be a Reader device that includes authentication capability. The Reader device may open a secure communication channel with the smartphone 642 to retrieve the access credential in response to the communication from the smartphone 642. The Reader device authenticates the access credential and communicates with the access controller 648 to allow access or deny access, or the Reader device can be a Reader/Control device that directly grants or denies access according to the authentication operation.

As noted previously herein, sensors can be used for closer range detection and authentication. An example of a sensor is the camera 552, 652 shown in the PAC system examples of FIGS. 5 and 6. Sensor data can be transferred to an authentication device using an FE device and a SIG device as in the example of FIG. 2, or the authentication device may be a Reader device located near the sensor to receive the sensor data directly.

The sensors provide sensor data (e.g., video image data or a video stream of video data if the sensor is a camera) used to determine one or more biometric identifiers for authentication of the person looking to gain access through the portal. In some examples, the authentication device granting or denying access to the person is a SIG remote from the access portal and sensor data is provided to a Sensor Access Service of the SIG. An authentication engine of the authentication device authenticates the person using the biometric identifiers. In some examples, the authentication device is a Reader device in the proximity of the physical access portal and the Reader device authenticates one or more biometric identifiers of the person.

The biometric identifiers can include facial recognition from video data generated by a sensor device. The data obtained from the sensor can be compared to a biometric database. The data base may be stored in memory of a server of the system backend. The biometric database may include multiple angles and poses of individuals that may be allowed access through the physical access portal. The angles and poses may be from images (e.g., photos) of the person taken during enrollment of the person as an employee. The multiple angles and poses are useful to match biometric even though the person may approach the sensor from different angles. The angle or pose of the person in the sensor data can be matched to the stored biometric angle or pose. The authentication engine may perform AI algorithms (e.g., a neural network algorithm) to implement the facial recognition.

Anti-spoofing measures can be applied to augment the facial recognition biometric. For example, the video data can be used to estimate the height of the person. As the person approaches the sensor, the authentication engine may measure the distance between eyes of the person and estimate the distance away from the sensor. The height of the person approaching can be estimated based on the top of the person's head and the distance between the eyes and the distance away from the sensor. The authentication engine may compare the estimated height to a recorded height for the individual as an added biometric to the facial recognition. Access through the physical portal may be granted based on the combined results of the biometric analysis.

In another example, the video data can be used to analyze the gait of the person as a biometric to augment facial recognition. The authentication engine may perform gait analysis to determine if the gait biometric of the person matches a recorded gait of the person identified by the facial recognition. In a further example, the authentication engine may analyze shadows included in a video stream. The authentication operation can include analyzing the video stream to detect shadows that don't move with respect to facial features. If the shadows don't move as expected, this may indicate that a photo or other still image may be being used to spoof the seamless access appliance. Background images can be used similarly. The authentication operation can include analyzing the background of the video stream to determine if the background is moving appropriately with the change in location of the face. In still another example, the person's apparel in the image can be compared to the day-to-day habits of the person to determine if the person's present appearance is in line with person's usual appearance.

The augmented biometrics may only be used when the facial recognition does not provide sufficient results. For example, there may be a correlation measurement included in the facial recognition that indicates how strongly the face in the video data matches the stored facial recognition data. The correlation measurement must meet a threshold correlation or else additional biometric measurements are used. Other non-biometric information can also be used. For example, the authentication device may check a tentatively identified person's work schedule to confirm that the identified person should be seeking the physical access.

In another example, an "electromagnetic signature" of a person day-to-day could be analyzed. Electromagnetic signals, such as BLE or WiFi signals emitted from devices (e.g., mobile devices, phones, tablets, laptops, smartwatches, etc.) commonly carried by a person can be monitored day-to-day. This electromagnetic signature may change if the person is carrying more devices or different devices than usual. This change may indicate that the person is not authentic.

If the confidence level of the analysis is still low, the seamless access device may require some action of the user to complete the authentication, such as by entering a password on a keypad or using a smartphone. Results of the facial recognition analysis and confirmation using secondary analysis can be used for machine learning of AI algorithms to improve the facial recognition.

According to some examples, authentication with sensor data and badge or smartphone credential authentication can be paired together for a two-factor authentication. For example, an authentication device could first authenticate a person a longer distance from the physical access portal based on credential information sent by the person's smartphone. Shorter range sensor-based authentication (e.g., facial recognition) could follow when the person is within range. This approach provides an authentication technique that matches the access credential with the biometric identification of the person. Detection of the presence of the credential device (e.g., through beacon signaling) may trigger authentication using sensors. In another example, authentication with the sensor data is performed first followed by authentication using a badge or smartphone. This allows the results of the biometric authentication to be checked using the access credential if the results of the authentication are not sufficient.

As explained previously herein, seamless access is access granted without intrusive actions of the user to show intent to access (e.g., presenting a card, entering a password, etc.) while maintaining the same level of security. The processing circuitry of an authentication device can include an intent detection engine. The intent detection engine uses the sensor data to determine that the person intends to pass through a physical access portal. The authentication device that includes the intent detection engine may be remotely located from the physical access portal (e.g., a SIG device) and the sensor data is sent to the authentication device from a front end device, or the authentication device may be located near the physical access portal (e.g., a reader device).

In some examples, the physical access portal includes multiple access portions, such as for example a secured double door. The intent detection engine determines which of the doors the person intends to enter and only opens that door, leaving the other door closed. For example, a camera may be positioned for each door. The intent detection engine may use video image data from each of the doors and compare the movement of the person in the two images to determine which of the doors the person intends to enter. The intent detection engine may compute a score for intent for each door and open the door with the highest resulting score. In another example, one or more magnetometer sensors or accelerometer sensors could be positioned by each door to detect which door the person intends to enter based on signals from the sensors. In another example, the sensors are located in the smartphone of the person and the intent detection engine detects movement of the smartphone to deduce intent of the person.

There can be security issues involved with seamless access control. For example, a seamless physical access system that opens the door when an authorized user is within two meters may allow multiple persons to enter instead of only the credentialed user when another person (authorized or not authorized) is close behind or "tailgating" the credentialed user.

Sensor data can be used to detect tailgating. If two persons are passing through the physical access portal close together, the authentication device may use facial recognition to authenticate both persons. If both persons pass authentication, the authentication device may do nothing. If the trailing person does not pass authorization, the authorization device may send an alert to the leading person (e.g., to the person smart phone) or send an alert or alarm to a security entity. In another example, users may carry beacon emitting badges and the authentication device can detect the number of people attempting to enter from the beacon signals emitted by the badges. Detection of tailgating can occur after the fact by detecting number of people within the secured space and comparing that number to the number of people logged as entering. For example, the number of people in the space can be determined using video data sent to the authentication device from one or more cameras.

Figure 7:
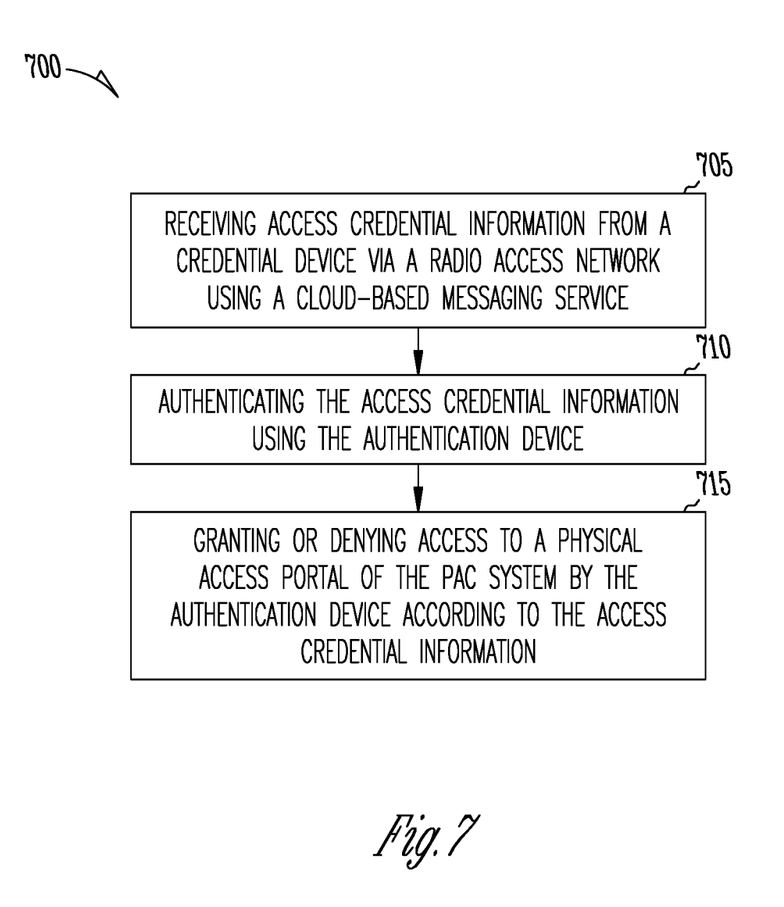
FIG. 7 is a flow diagram of a method of operating a seamless PAC system.

FIG. 7 is a flow diagram of a method 700 of operating a seamless PAC system. At 705, access credential information from a credential device is received by an authentication device of the PAC system. The credential information may be a data object that provides proof of the identity of the user of the credential device for access through a physical portal controlled by the PAC system. The credential information is received by the authentication device via a radio access network using a cloud-based messaging service. In some examples, the authentication device sends an activation message to the credential device using the cloud-based messaging service in response to detection of a beacon signal from the credential device. The beacon may be detected using a beacon reader device of the PAC system. In some examples, the credential device sends the credential information in response to detecting a beacon signal transmitted by the PAC system. The beacon signal may be transmitted by a beacon transmitting device of the PAC system.

At 710, the access credential information is authenticated using the authentication device. The credential information may be compared to authorization database stored by the authentication device, and the user is authorized when the credential information matches data for authorized users. At 715, access is granted when the credential information indicates that the user of the credential device is authorized for access and access is denied otherwise.

In some examples, the authentication device authenticates the user using biometric information. Sensor devices located near the physical access portal collect sensor data for the user. The sensor data is compared to biometric data for authorized users. Access is granted when the sensor data and credential data indicate that the user is an authorized user.

Figure 8:
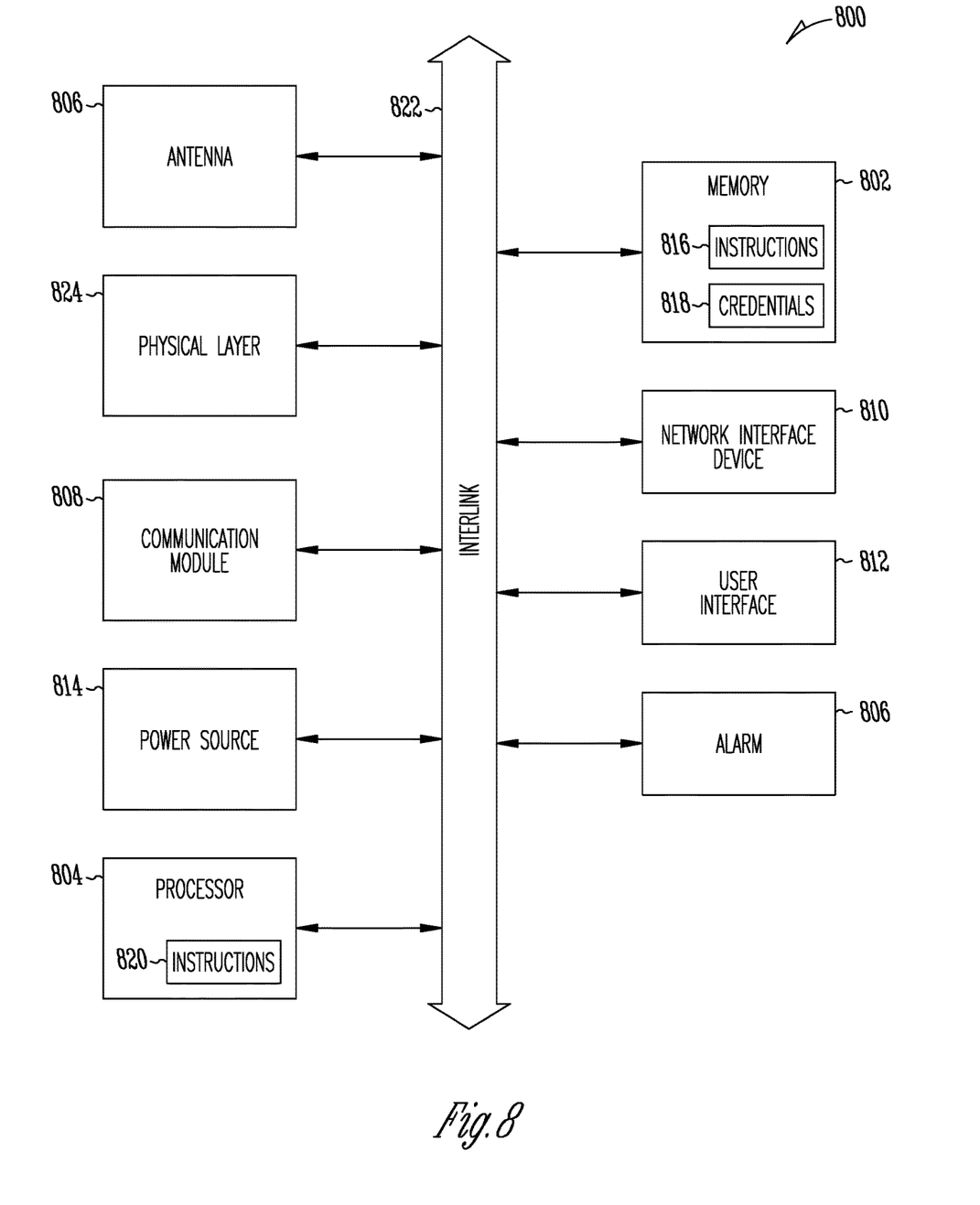
FIG. 8 is a block diagram schematic of portions of an example of an authentication device.

FIG. 8 is a block diagram schematic of various example components of an authentication device for supporting the device architectures described and illustrated herein. The device 800 of FIG. 8 could be, for example, an authentication device that analyzes evidence of authority, status, rights, and/or entitlement to privileges for a holder of a credential device. At a basic level, a credential device can be a portable device having memory, storing one or more user credentials or credential data, and an interface (e.g., one or more antennas and Integrated Circuit (IC) chip(s)), which permit the credential device to exchange data with another device, such as an authentication device. One example of credential device is an RFID smartcard that has data stored thereon allowing a holder of the credential device to access a secure area or asset protected by a reader device. Another example of a credential device is a smartphone that has the data stored in memory.

With reference specifically to FIG. 8, examples of an authorization or authentication device 800 for supporting the device architecture described and illustrated herein may generally include one or more of a memory 802, a processor 804, one or more antennas 806, a communication module 808, a network interface device 810, a user interface 812, and a power source 814 or power supply.

Memory 802 can be used in connection with the execution of application programming or instructions by processor 804, and for the temporary or long-term storage of program instructions or instruction sets 816, authorization data 818, such as credential data, credential authorization data, or access control data or instructions, as well as any data, data structures, and/or computer-executable instructions needed or desired to support the above-described device architecture. For example, memory 802 can contain executable instructions 816 that are used by the processor 804 to run other components of device 800, to make access determinations based on credential or authorization data 818, and/or to perform any of the functions or operations described herein, such as the method of FIG. 7 for example. Memory 802 can comprise a computer readable medium that can be any medium that can contain, store, communicate, or transport data, program code, or instructions for use by or in connection with device 800. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer readable media includes, but is not to be confused with, computer readable storage medium, which is intended to cover all physical, non-transitory, or similar embodiments of computer readable media.

Processor 804 can correspond to one or more computer processing devices or resources. For instance, processor 804 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 804 can be provided as a microprocessor, Central Processing Unit (CPU), or plurality of microprocessors or CPUs that are configured to execute instructions sets stored in an internal memory 820 and/or memory 802.

Antenna 806 can correspond to one or multiple antennas and can be configured to provide for wireless communications between device 800 and another device. Antenna(s) 806 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 806 may include one or more antennas arranged to operate using UWB for in band activity/communication and Bluetooth (e.g., BLE) for out-of-band (OOB) activity/communication. However, any RFID or personal area network (PAN) technologies, such as the IEEE 802.15.1, near field communications (NFC), ZigBee, GSM, CDMA, Wi-Fi, etc., may alternatively or additionally be used for the OOB activity/communication described herein.

Device 800 may additionally include a communication module 808 and/or network interface device 810. Communication module 808 can be configured to communicate according to any suitable communications protocol with one or more different systems or devices either remote or local to device 800. Network interface device 810 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, or IEEE 802.16 family of standards known as WiMax), IEEE 802.15.4 family of standards, and peer-to-peer (P2P) networks, among others. In some examples, network interface device 810 can include an Ethernet port or other physical jack, a Wi-Fi card, a Network Interface Card (NIC), a cellular interface (e.g., antenna, filters, and associated circuitry), or the like. In some examples, network interface device 810 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 806, communication module 808, and/or network interface device 810 or subcomponents thereof, may be integrated as a single module or device, function or operate as if they were a single module or device, or may comprise of elements that are shared between them.

User interface 812 can include one or more input devices and/or display devices. Examples of suitable user input devices that can be included in user interface 812 include, without limitation, one or more buttons, a keyboard, a mouse, a touch-sensitive surface, a stylus, a camera, a microphone, etc. Examples of suitable user output devices that can be included in user interface 812 include, without limitation, one or more LEDs, an LCD panel, a display screen, a touchscreen, one or more lights, a speaker, etc. It should be appreciated that user interface 812 can also include a combined user input and user output device, such as a touch-sensitive display or the like. Alarm circuit 826 may provide an audio signal to a speaker or may activate a light or present an alarm condition using a display device.

Power source 814 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 800.

Device 800 can also include one or more interlinks or buses 822 operable to transmit communications between the various hardware components of the device. A system bus 822 can be any of several types of commercially available bus structures or bus architectures.

Additional Disclosure and Examples

Example 1 includes subject matter (such as physical access control (PAC) system) comprising an authentication device including physical layer circuitry configured to transmit and receive radio frequency electrical signals with a radio access network, and processing circuitry. The processing circuitry is operatively coupled to the physical layer circuitry and includes an authentication engine configured to receive access credential information via the radio access network using a cloud-based messaging service, authenticate the access credential information using the authentication device, and initiate access to a physical access portal according to the access credential information.

In Example 2, the subject matter of Example 1 optionally includes a beacon reader device configured to detect a beacon signal transmit by a credential device and transmit a beacon detection message to the authentication device in response to the detection of the beacon signal. The processing circuitry is optionally configured to initiate transmission of an activation message to the credential device using the cloud-based messaging system in response to the beacon detection message, and receive the access credential information from the credential device via the cloud-based messaging service.

In Example 3, the subject matter of Example 2 optionally includes a beacon reader device configured to detect a Bluetooth low energy (BLE) beacon signal transmit by a smartphone credential device.

In Example 4, the subject matter of one or any combination of Examples 1-3 optionally includes a beacon transmitting device configured to transmit a beacon signal detectable by a credential device. The processing circuitry is optionally configured to receive a request to open a communication session from the credential device and receive the access credential information during the communication session.

In Example 5, the subject matter of one or any combination of Examples 1-4 optionally includes one or more sensor devices configured to generate sensor data associated with a user of the credential device and to provide the sensor data to the authentication device via a local area network (LAN), memory configured to store biometric information, and an authentication engine configured to authenticate identity of the user of the credential device by comparing the sensor data to the biometric information.

In Example 6, the subject matter of Example 5 optionally includes an intent detection engine configured to determine physical access intent of the user of the credential device using the sensor data, and an authentication device configured to grant access to the physical access portal according to the access credential information and the determined physical access intent of the user of the credential device.

In Example 7, the subject matter of Example 6 optionally includes a controller configured to open a first portion of multiple portions of the physical access portal according to the physical access intent of the user of the credential device.

Example 8 includes subject matter (such as a method of operating a seamless PAC system) or can optionally be combined with one or any combination of Examples 1-7 to include such subject matter, comprising receiving, by an authentication device of the PAC system, access credential information from a credential device via a radio access network using a cloud-based messaging service, authenticating the access credential information using the authentication device, and granting or denying access to a physical access portal of the PAC system by the authentication device according to the access credential information.

In Example 9, the subject matter of Example 8 optionally includes receiving, by the authentication device, a beacon detection message from a beacon reader device of the PAC system, wherein the beacon detection message indicates detection of a credential device; sending an activation message to wake the credential device from a low power mode using the cloud-based messaging service in response to the beacon detection message; and receiving the credential information in subsequent cloud-based communication with the credential device.

In Example 10, the subject matter of Example 9 optionally includes detecting, by the beacon reader device, a low energy beacon of a smartphone operating as a Bluetooth peripheral device; transmitting, by the beacon reader device, the beacon detection message to the authentication device in response to the detecting of the low energy beacon; and sending the activation message to the smartphone.

In Example 11, the subject matter of Example 8 optionally includes transmitting a beacon using a beacon transmitting device of the PAC system, receiving a request from a credential device to open a communication session by the authentication device via the cloud-based messaging service, and receiving the credential information in subsequent cloud-based messaging with the credential device.

In Example 12, the subject matter of Example 11 optionally includes transmitting a Bluetooth low energy beacon, and receiving the request to open the communication session from a smartphone operating as a Bluetooth central device.

In Example 13, the subject matter of one or any combination of Examples 8-12 optionally includes receiving, by the authentication device, sensor data from one or more sensors via a LAN, authenticating a user of the credential device for access through the physical portal by comparing the sensor data to biometric data, and granting or denying access to the physical portal by the authentication device according to the access credential information and the sensor data.

In Example 14, the subject matter of Example 13, optionally includes authenticating the user by an authentication device that includes a server having a memory to store the biometric information.

In Example 15, the subject matter of one or both of Examples 13 and 14 optionally includes controlling access to the physical portal using a controller at the physical access portal according to authentication by an authentication device that is remote from the physical access portal and includes an authentication policy.

In Example 16, the subject matter of one or any combination of Examples 13-15 optionally includes using the sensor data to determine access intent of a user of the credential device.

In Example 17, the subject matter of Example 16 optionally includes opening a first portion of multiple portions of the physical access portal using a controller of the PAC system according to the determined access intent of the user of the credential device.

Example 18 can include subject matter (such as PAC system) or can optionally be combined with one or any combination of Examples 1-17 to include such subject matter, comprising a Secure Internet of things Gateway (SIG) device. The SIG device includes physical layer circuitry configured to receive authentication data from multiple front end devices via one or more communication networks, and processing circuitry operatively coupled to the physical layer circuitry. The processing circuitry includes an authentication engine configured to process the authentication data to determine access to multiple physical access portals according to the authentication data, and control access of the multiple physical access portals according to the authentication data.

In Example 19, the subject matter of Example 18 optionally includes multiple front end devices each configured to communicate information with the SIG device via a communication network of the one or more communication networks. The SIG device optionally includes memory to store credential information, and multiple secure elements each configured to open a secure communication channel with a credential device via a front end device of the multiple front end devices and receive encrypted credential information from the credential device as the authentication data. The authentication engine is optionally configured to compare the received credential information and the stored credential information to grant or deny access to one or more of the multiple physical access portals.

In Example 20, the subject matter of Example 19 optionally includes a secure element that stores cryptographic keys and the SIG device is configured to send the cryptographic keys to a credential device via a front end device to establish the secure communication channel with the credential device.

In Example 21, the subject matter of one or any combination of Examples 18-20 optionally includes a front end device operatively coupled to a communication network of the one or more communication networks and configured to send sensor data to the SIG device. The SIG device optionally includes memory to store biometric information, a sensors access service to receive the sensor data from one or more front end devices, and an authentication engine configured to compare the received sensor data and the stored biometric information to grant or deny access to one or more of the multiple physical access portals.

In Example 22, the subject matter of Example 21 optionally includes a front end device configured to send video data to the SIG device and the sensors access service is configured to receive the video data from the front end device. The authentication engine is configured to perform facial recognition using the received video data and stored biometric information to grant or deny access to one or more of the multiple physical access portals.

In Example 23, the subject matter of one or any combination of Examples 18-22 optionally includes an intent detection engine configured to determine access intent of a user of a credential device according to the sensor data.

The above non-limiting Examples can be combined in any permutation. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A physical access control (PAC) system controlling access to a physical access portal, the PAC system comprising:
    an authentication device remote from the physical access portal comprising:
        physical layer circuitry configured to transmit and receive radio frequency electrical signals with a radio access network; and
        processing circuitry operatively coupled to the physical layer circuitry and comprising an authentication engine configured to:
        determine presence of a credential device local to the physical access portal;
        activate an application of the of the credential device without user input to the credential device in response to the determined presence of the credential device;

open a secure communication session with the application of the credential device using a cloud-based messaging service via the radio access network;
retrieve access credential information from memory of the credential device using the secure communication session;
authenticate the access credential information; and
authorize access for the credential device to the physical access portal according to the access credential information.

2. The system of claim 1, comprising:
a beacon reader device local to the physical access portal configured to detect a beacon signal transmitted by the credential device and transmit a detection message to the authentication device in response to the detection of the beacon signal;
wherein the processing circuitry of the authentication device is further configured to initiate transmission of an activation message to the credential device using the cloud-based messaging system in response to receiving the detection message.

3. The system of claim 2, wherein the beacon reader device is configured to detect a Bluetooth low energy (BLE) beacon signal transmitted by a smartphone credential device.

4. The system of claim 1, comprising:
a beacon transmitting device configured to transmit a beacon signal detectable by the credential device;
wherein the processing circuitry of the authentication device is further configured to receive a detection message as a request to open a communication session from the credential device.

5. The system of claim 1, comprising:
one or more sensor devices configured to generate sensor data associated with a user of the credential device and to provide the sensor data to the authentication device via a local area network (LAN); and
memory configured to store biometric information;
wherein the authentication engine is configured to authenticate an identity of the user of the credential device by comparing the sensor data to the biometric information.

6. The system of claim 1, comprising:
one or more sensor devices configured to generate sensor data associated with a user of the credential device and to provide the sensor data to the authentication device via a local area network (LAN);
wherein the processing circuitry of the authentication device comprises an intent detection engine configured to determine physical access intent of the user of the credential device using the sensor data; and
wherein the authentication device is configured to grant access to the physical access portal according to the access credential information and the determined physical access intent of the user of the credential device.

7. The system of claim 6, comprising a controller configured to open a first portion of multiple portions of the physical access portal according to the physical access intent of the user of the credential device.

8. A method of operating a seamless physical access control (PAC) system, the method comprising:
determining presence of a credential device local to a physical access portal;
activating, by an authentication device of the PAC system located remote from the physical access portal of the PAC system, an application of the credential device without user input to the credential device in response to the determining presence of the credential device;
opening, by the authentication device, a secure communication session with the application of the credential device via a radio access network using a cloud-based messaging service;
retrieving, by the authentication device, access credential information from memory of the credential device using the secure communication session;
authenticating the access credential information using the authentication device; and
granting or denying access to the physical access portal by the authentication device according to the access credential information.

9. The method of claim 8, comprising:
receiving, by the authentication device, a detection message from a beacon reader device of the PAC system; and
sending an activation message to wake the credential device from a low power mode using the cloud-based messaging service in response to receiving the detection message.

10. The method of claim 9, comprising:
detecting, by the beacon reader device, a low energy beacon of a smartphone operating as a Bluetooth peripheral device; and
transmitting, by the beacon reader device, the detection message to the authentication device in response to the detecting of the low energy beacon;
wherein sending the activation message to the credential device comprises sending the activation message to the smartphone.

11. The method of claim 8, comprising:
transmitting a beacon using a beacon transmitting device of the PAC system; and
receiving, by the authentication device via the cloud-based messaging service, a detection message as a request from the credential device to open a communication session.

12. The method of claim 11, wherein:
transmitting the beacon comprises transmitting a Bluetooth low energy beacon; and
wherein receiving the request to open a communication session comprises receiving the request from a smartphone operating as a Bluetooth central device.

13. The method of claim 8, comprising:
receiving, by the authentication device, sensor data from one or more sensors via a local area network (LAN); and
authenticating a user of the credential device for access through the physical portal by comparing the sensor data to biometric data;
wherein granting or denying access comprises granting or denying access to the physical portal by the authentication device according to the access credential information and the sensor data.

14. The method of claim 13, wherein authenticating the user comprises authenticating the user by the authentication device, wherein the authentication device comprises a server having a memory to store the biometric information.

15. The method of claim 13, wherein granting or denying access comprises controlling access to the physical portal using a controller at the physical access portal according to authentication by the authentication device.

16. The method of claim 8, comprising:
receiving, by the authentication device, sensor data from one or more sensors via a local area network (LAN); and
using the sensor data to determine access intent of a user of the credential device.

17. The method of claim 16, comprising opening a first portion of multiple portions of the physical access portal using a controller of the PAC system according to the determined access intent of the user of the credential device.

\* \* \* \* \*